United States Patent
Brown et al.

(10) Patent No.: US 11,598,684 B1
(45) Date of Patent: Mar. 7, 2023

(54) THICKNESS-SHEAR MODE RESONATORS

(71) Applicant: Precis LLC, South Jordan, UT (US)

(72) Inventors: Scott Brown, Riverton, UT (US); Lon Perry, South Jordan, UT (US)

(73) Assignee: Precis LLC, South Jordan, UT (US)

( * ) Notice: Subject to any disclaimer, the term of this patent is extended or adjusted under 35 U.S.C. 154(b) by 83 days.

(21) Appl. No.: 17/321,225

(22) Filed: May 14, 2021

(51) Int. Cl.
  *G01L 9/00* (2006.01)
  *G01L 19/00* (2006.01)

(52) U.S. Cl.
  CPC ........ *G01L 9/0022* (2013.01); *G01L 19/0061* (2013.01)

(58) Field of Classification Search
  None
  See application file for complete search history.

(56) References Cited

U.S. PATENT DOCUMENTS

| | | | |
|---|---|---|---|
| 3,617,780 A | | 11/1971 | Benjaminson et al. |
| 5,233,261 A | | 8/1993 | Wajid |
| 5,325,012 A | | 6/1994 | Sato et al. |
| 5,578,759 A | | 11/1996 | Clayton |
| 6,111,340 A | | 8/2000 | Sinha et al. |
| 6,131,462 A | | 10/2000 | Eernisse et al. |
| 6,147,437 A | | 11/2000 | Matsumoto et al. |
| 6,196,059 B1 | | 3/2001 | Koesslinger et al. |
| 7,334,483 B2 | * | 2/2008 | Sato ...................... G01L 9/0022 73/708 |
| 7,654,137 B2 | * | 2/2010 | Hirata ................... G01F 1/6842 73/204.18 |
| 8,294,332 B2 | * | 10/2012 | Matsumoto ........ H03H 9/02133 310/338 |
| 8,429,976 B2 | * | 4/2013 | Matsumoto ........... G01L 9/0022 73/702 |
| 9,528,896 B2 | | 12/2016 | Eernisse et al. |
| 10,048,146 B2 | * | 8/2018 | Puccio ................. G01L 9/0022 |
| 10,451,508 B2 | * | 10/2019 | Daito .................... G01L 9/0052 |
| 11,022,509 B2 | * | 6/2021 | Cavalloni ............... G01P 15/09 |
| 11,359,983 B1 | * | 6/2022 | Brown ............... H03H 9/02023 |
| 2008/0223142 A1 | | 9/2008 | Iimori et al. |

(Continued)

FOREIGN PATENT DOCUMENTS

| WO | 98/01732 A1 | 1/1998 |
|---|---|---|
| WO | 2015/006536 A1 | 1/2015 |

OTHER PUBLICATIONS

Requirement for Restriction/Election received for U.S. Appl. No. 16/374,476, dated Aug. 20, 2021, 6 pages.

(Continued)

*Primary Examiner* — Peter J Macchiarolo
*Assistant Examiner* — Jermaine L Jenkins
(74) *Attorney, Agent, or Firm* — Workman Nydegger

(57) ABSTRACT

A pressure sensor that resonates in the thickness-shear mode (TSM) includes a center resonator structure, a first electrode positioned on a first side of the center resonator structure, and a first electrode flag. The first electrode flag forms a first electrically conductive path from the first electrode toward an outer portion of the center resonator structure. The first electrode flag extends at least partially over the first side of the center resonator structure. The first electrode flag also includes one or more first tab metals migrated thereinto from opposing sides of the first electrode flag.

17 Claims, 3 Drawing Sheets

(56) References Cited

U.S. PATENT DOCUMENTS

| | | | |
|---|---|---|---|
| 2009/0009036 A1 | 1/2009 | Matsumoto et al. |
| 2010/0242615 A1 | 9/2010 | Sato et al. |
| 2011/0283801 A1 | 11/2011 | Matsumoto |
| 2012/0181900 A1 | 7/2012 | Puccio et al. |
| 2014/0278155 A1 | 9/2014 | Eernisse et al. |
| 2015/0059483 A1 | 3/2015 | Puccio et al. |
| 2017/0350780 A1 | 12/2017 | Daito et al. |
| 2019/0199311 A1 | 6/2019 | Yoshioka |
| 2019/0229704 A1 | 7/2019 | Morimoto et al. |
| 2022/0077841 A1 | 3/2022 | Ishino et al. |

OTHER PUBLICATIONS

United States U.S. Appl. No. 16/374,466, filed Apr. 3, 2019.
United States U.S. Appl. No. 16/374,476, filed Apr. 3, 2019.
United States U.S. Appl. No. 62/652,780, filed Apr. 4, 2018.
United States U.S. Appl. No. 62/652,782, filed Apr. 4, 2018.
Eernisse, E. P., T. D. McConnell, and A. F. Veneruso. Development of a high resolution downhole pressure instrument for high temperature applications. No. SAND-78-1550C; CONF-7810170-1. Sandia Labs., Albuquerque, NM (USA), 1978 (Year: 1978).
Final Office Action received for U.S. Appl. No. 16/374,476, dated Jun. 17, 2022, 18 pages.
Non-Final Office Action received for U.S. Appl. No. 16/374,466, dated Aug. 4, 2022, 18 pages.
Non-Final Office Action received for U.S. Appl. No. 16/374,476, dated Aug. 23, 2022, 20 pages.
Non-Final Office Action received for U.S. Appl. No. 17/499,573, dated Sep. 29, 2022, 11 pages.
Notice of Allowance received for U.S. Appl. No. 16/898,824, dated Feb. 15, 2022, 5 pages.
Requirement for Restriction/Election received for U.S. Appl. No. 17/499,573, dated Sep. 14, 2022, 6 pages.
Requirement for Restriction/Election received for U.S. Appl. No. 16/374,466, dated Jun. 30, 2022, 7 pages.

* cited by examiner

THICKNESS-SHEAR MODE RESONATORS

BACKGROUND

Technical Field

This disclosure generally relates to pressure sensors. More specifically, the present disclosure relates to quartz pressure sensors that resonate in the thickness-shear mode (TSM).

Related Technology

Petroleum is the lifeblood of modern industrialized society. Petroleum is extracted from petroleum reservoirs and refined into myriad products, including fuel for powering combustion engines (e.g., diesel fuel, jet fuel, and octane) or providing heat (e.g., kerosene). Additionally, olefinic and paraffinic hydrocarbons are generated during the refining process, and these compounds are foundational in the manufacturing of many plastics. Because of its utility and rich potential, there is a continual demand for petroleum. However, extracting and refining petroleum is a tremendously time and resource intensive process. Due to a variety of technical and geological obstacles, it is difficult, if not entirely improbable, to recover all of the petroleum contained in a reservoir. Even with advances in drilling and extraction technologies, the average recovery from a petroleum reservoir is about 35% of the available petroleum. While this represents a significant increase in the average petroleum recovery in recent years, it also means that about 65% of the petroleum found in a typical reservoir remains unrecovered from an economic and/or technical standpoint.

With regard to reservoir productivity, operators are burdened with monitoring and analyzing each individual well in an effort to maximize the rate of petroleum extraction, or well productivity. Well productivity is influenced by a number of disparate factors, including, for example, extraction volume, reservoir pressure, temperature, bore path, fluid profiles in production and injection wells, injection rates and/or pressures, among others. Access to accurate and dependable, real-time measurements are imperative for maximizing well productivity and for understanding the complexities and interrelated effects each well has with respect to aggregate productivity for an entire reservoir and/or oil field. Accordingly, there is a need for responsive and reliable sensors, including, for example, pressure sensors.

Pressure in oil/gas wells can be measured using various sensor technologies. One such technology includes a pressure transducer comprised of a piezoelectric resonator located within a housing that responds to environmental pressures. For example, a quartz TSM resonator is a type of pressure sensor that has been used successfully in downhole environments of oil and gas wells to accurately determine downhole pressures. Most quartz TSM resonators include a quartz TSM crystal resonator disposed within a resonator housing exposed to ambient downhole or bottom-hole fluid pressure. The quartz TSM resonator is coupled to an electrical circuit, and because quartz is a piezoelectric material, the electrical circuit can be used to oscillate the quartz TSM crystal resonator located inside the housing. The frequency of the quartz TSM crystal resonator oscillations can be measured and are primarily a function of the observed environmental pressure. Consequently, changes in the frequency of the quartz TSM crystal within the quartz TSM resonator correspond to changes in the observed environmental pressure.

Typically, a quartz TSM resonator is cylindrical in shape and is comprised of three components: a center resonator structure (e.g., a quartz TSM crystal resonator) and two hollowed caps bonded to the center resonator structure. The bonded caps act to isolate the center resonator structure from the surrounding downhole fluids, allowing it to freely resonate in the center. Unfortunately, current materials, practices, and/or techniques for bonding the center resonator structure to the end caps negatively affects the stability and/or performance of quartz TSM resonators, which may reduce the reliability of sensor data and/or the longevity of the sensors, thereby threatening the efficiency of well productivity and/or net asset recovery.

Accordingly, there are a number of disadvantages associated with conventional TSM resonators that can be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Implementations of the present disclosure extend at least to pressure sensors and methods for forming the same (e.g., quartz TSM resonators).

Some embodiments provide a pressure sensor that resonates in the thickness-shear mode (TSM). The pressure sensor includes a center resonator structure, a first electrode positioned on a first side of the center resonator structure, and a first electrode flag. The first electrode flag forms a first electrically conductive path from the first electrode toward an outer portion of the center resonator structure. The first electrode flag extends at least partially over the first side of the center resonator structure. The first electrode flag also includes one or more first tab metals migrated thereinto from opposing sides of the first electrode flag.

Some embodiments provide a method for creating a quartz pressure sensor that resonates in the thickness-shear mode (TSM). The method includes obtaining a center resonator structure, arranging a first underlying tab to a first side of the center resonator structure, and arranging a first electrode flag to extend over the first underlying tab from a first electrode positioned on the first side of the center resonator structure. Arranging the first electrode flag to extend from the first electrode over the first underlying tab causes the first underlying tab to be positioned between the first electrode flag and the center resonator structure. The method also includes arranging a first overlaying tab over the first electrode flag such that the first overlaying tab and the first underlying tab become arranged on opposing sides of the first electrode flag. The method furthermore includes causing tab metal from the first underlying tab to migrate into the first electrode flag and causing tab metal from the first overlaying tab to migrate into the first electrode flag.

Some embodiments provide a quartz pressure sensor that resonates in the thickness-shear mode (TSM). The quartz pressure sensor includes a center resonator structure and a first cap bonded to a first side of the center resonator structure. The first cap and the center resonator structure form a first cavity between the first cap and the first side of the center resonator structure. Furthermore, a pressure within the first cavity is below 130 torr.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

DETAILED DESCRIPTION

Figure 1:
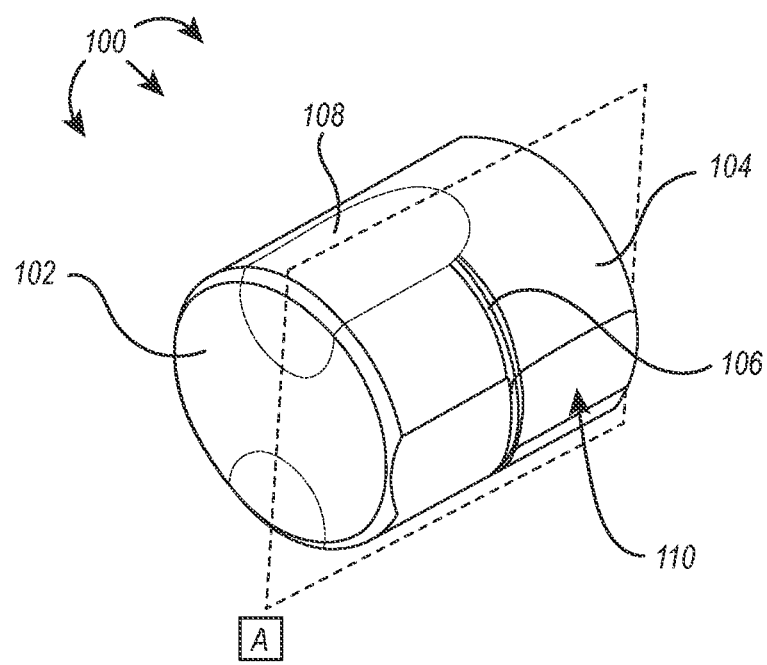
FIG. 1 illustrates a top perspective view of an example assembled quartz TSM resonator.

Implementations of the present disclosure extend to pressure sensors that resonate in the thickness-shear mode (TSM).

As indicated above, a quartz TSM resonator typically includes a quartz TSM crystal resonator and two hollowed caps bonded to opposing sides of the TSM crystal. To facilitate oscillation of the quartz TSM crystal resonator, quartz TSM crystal resonators typically include electrodes on opposing sides thereof with electrode flags extending outward from the electrodes. The electrode flags reach an outer portion of the quartz TSM resonator to connect to a variety of external lead attachments, allowing the quartz TSM crystal resonator to connect to an oscillator circuit.

The opposing caps of a conventional quartz TSM resonator typically attach to the TSM crystal resonator via sealing glass, which is applied (e.g., at room temperature) and then fired at a predefined firing temperature (e.g., to bond the caps to the quartz TSM resonator while the parts are pressed together). The electrode flags extend under the sealing glass between the cap(s) and the crystal resonator to connect with the external leads (e.g., to facilitate connection to an oscillator circuit).

Electrode flags of TSM resonators are typically formed from gold or platinum. Such electrode flags are prone to tearing due to stresses introduced as quartz TSM resonators cool after heating the sealing glass to bond the caps to the crystal resonator. To combat this tearing, many quartz TSM resonators include an underlying tab positioned between the electrode flag and the quartz crystal resonator. The underlying tab is generally composed of a metal that bonds well to the quartz crystal resonator (e.g., chromium, titanium, etc.) and that is able to migrate into the electrode flag material (e.g., at high temperatures). Because the underlying tab adheres well to the quartz crystal resonator and migrates into the electrode flag, the inclusion of the underlying tab for the bonding process can facilitate a strong connection between the quartz crystal resonator and the electrode flag.

Unfortunately, sealing glass used in conventional quartz TSM resonators does not typically adhere well to the gold or platinum electrode flags. Although some tab metal from an underlying tab positioned on one side of an electrode flag can migrate to the opposing side of the electrode flag during the heating process, the opposing side of the electrode flag usually retains a high concentration of gold or platinum, which the sealing glass does not adhere well to.

Accordingly, at least some quartz TSM resonators of the present disclosure provide an electrode flag that includes tab metal migrated thereinto from two sides thereof (e.g., the side that faces the quartz crystal resonator, and the opposing side that faces a cap). For example, a quartz TSM resonator may include an overlaying tab and an underlying tab that form a "tab sandwich" around an electrode flag, such that tab metal migrates into both sides of the electrode flag during the firing process. Like the underlying tab, the overlaying tab forms a strong bond with the electrode flag. Furthermore, because the overlaying tab adheres well to the sealing glass and migrates into the electrode flag, the inclusion of the overlaying tab for the bonding process can advantageously facilitate a strong connection between the sealing glass and the electrode flag.

By strengthening the bond between the sealing glass (and therefore the cap) and the electrode flag (and therefore the quartz crystal resonator), implementations of the present disclosure can increase the accuracy and/or long-term stability of quartz TSM sensors in a significant way. For example, it has been shown that utilizing techniques of the present disclosure to form quartz TSM sensors can facilitate a 50-200% improvement in the long-term stability of quartz TSM sensors under constant pressure/stress.

Having described some of the various high-level features and benefits of the disclosed embodiments, attention will now be directed to FIGS. 1 through 5. These Figures illustrate various supporting illustrations related to the disclosed embodiments.

FIG. 1 illustrates a top perspective view of an example assembled quartz TSM resonator 100. As illustrated in FIG. 1, the quartz TSM resonator 100 includes a top cap 102 and a bottom cap 104 bonded to a center resonator structure 106 and associated with external electrodes 108. It should be appreciated that any of the top cap 102, the bottom cap 104, and/or the center resonator structure 106 can include quartz crystal that is cut in accordance with its intended use and as known in the art. For example, the center resonator structure 106 can include an AT-cut crystal, a near AT-cut crystal, a BT-cut crystal, a near BT-cut crystal, SC-cut crystal, a near SC-cut crystal, an RT-cut crystal, an SBTC-cut crystal, and/or others. Furthermore, the center resonator structure may comprise a single mode or dual-mode crystal.

In the example shown in FIG. 1, the quartz TSM resonator 100 additionally includes a flat or flats 110 that can be used to align each of the top cap 102, the bottom cap 104, and/or the center resonator structure 106, which alignment is generally required during bonding due to anisotropic nature of crystalline quartz. As may be better depicted in FIG. 2, which illustrates a cross-section (A) of the quartz TSM resonator 100 of FIG. 1, the top cap 102 and the bottom cap 104 are bonded to the center resonator structure 106. The components of the quartz TSM resonator 100 are preferably bonded using a sealing glass that with a melting point below 573° C., the Curie point of quartz. Glass bonding is preferred as metal bonding would interfere with the external electrodes 108 and 108' on the resonator structure and direct quartz bonding is impractical given manufacturing limitations of the center resonator structure 106 and caps 102, 104.

Figure 2:
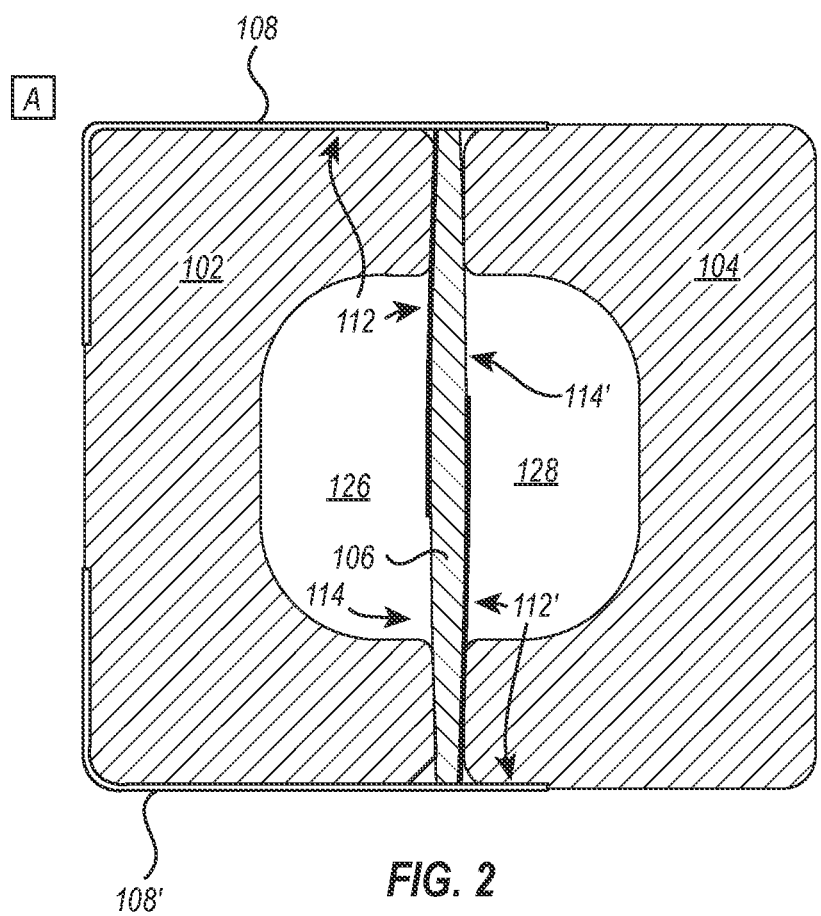
FIG. 2 illustrates a cross-sectional view of the quartz TSM resonator of FIG. 1 taken along plane A, as indicated in FIG. 1.

As additionally shown in the cross-section (A) of FIG. 2, the external electrodes 108 and 108' are deposited on an exterior surface of the caps 102 and 104 and may wrap around to a top face of cap 102. The external electrodes 108 and 108' allow for electrical connectivity between an oscillator circuit (not shown) and the TSM resonator 100, particularly the center resonator structure 106. FIG. 2 also illustrates that the external electrode 108 forms part of a first electrically conductive path 112 that extends from a first side 114 of the center resonator structure 106 to the exterior of the quartz TSM resonator 100. Similarly, the external electrode 108' forms part of a second electrically conductive path 112' that extends from a second side 114' of the center resonator structure to the exterior of the quartz TSM resonator 100. The electrically conductive paths 112, 112' allow an oscillator circuit (not shown) to drive the center resonator structure 106 to facilitate pressure measurements using the oscillation frequency of the center resonator structure 106.

Figure 3:
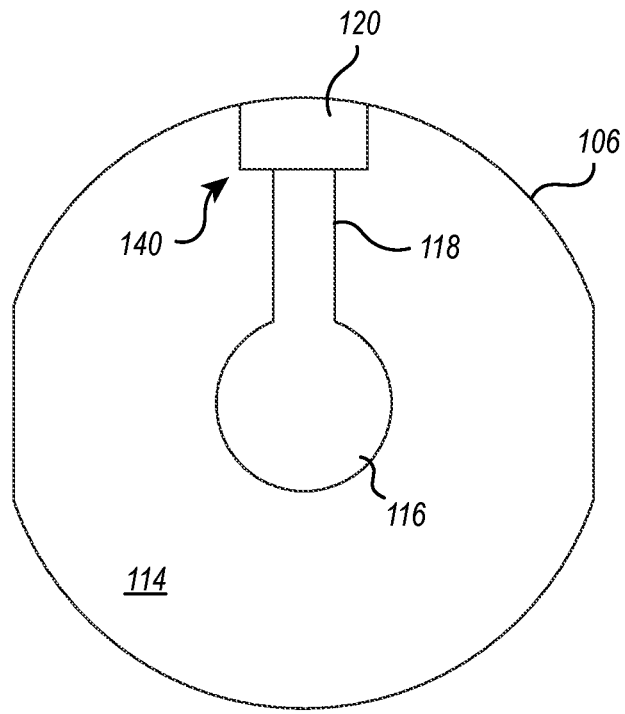
FIG. 3 illustrates a top view of an example center resonator structure with an electrode, electrode flag, and overlaying tab connected thereto.

FIG. 3 illustrates a top view of the center resonator structure 106 of the quartz TSM resonator 100 of FIGS. 1 and 2 (with the caps 102 and 104 removed therefrom). FIG. 3 depicts additional components that form the electrically conductive path 112 mentioned above. In particular, FIG. 3 illustrates an electrode 116 connected to the first side 114 of the center resonator structure 106, with an electrode flag 118 extending from the electrode 116 (over the first side 114 of the center resonator structure 106) toward an outer portion of the center resonator structure 106. The electrode flag 118 facilitates electrical connection between the electrode 116 and the external electrode 108 mentioned above with reference to FIG. 2. In this regard, the electrode 116, the electrode flag 118, and the external electrode 108 form the electrically conductive path 112 mentioned above.

The electrode 116, the electrode flag 118, and/or the external electrode 108 may be formed from any suitable electrically conductive material, typically gold or platinum. Furthermore, the electrode 116 and the electrode flag may be integrally formed with one another or may be separate components that are connected/connectable to one another.

As discussed above, gold or platinum electrode flags used in quartz TSM resonators often do not adhere well to sealing glass used to bond caps (e.g., caps 102 or 104) to quartz crystal resonators (e.g., center resonator structure 106). Such failure to adhere can even occur where an underlying tab is placed between the electrode flag and the quartz crystal resonator to allow tab metal to migrate into the electrode flag from one side thereof (as discussed above and depicted hereinafter with reference to FIG. 4). Accordingly, in the example depicted in FIG. 3, an overlaying tab 120 is placed over an outer portion 140 of the electrode flag 118. The outer portion 140 corresponds to the portion of the electrode flag 118 over which sealing glass may be applied to bond the cap 102 to the center resonator structure 106 and associated components (see FIG. 4).

The overlaying tab 120 may comprise a tab metal that migrates into the electrode flag 118 when heated, forming an intermetallic bond between the overlaying tab 120 and the electrode flag 118. Furthermore, the overlaying tab 120 may comprise a tab metal that adheres well to sealing glass used to bond the cap 102 to other portions of the quartz TSM resonator 100. In this regard, placing an overlaying tab 120 over an electrode flag 118 as discussed above may facilitate a solid bond between a cap (e.g., cap 102), tab 124, electrode flag 118, and tab 122, thereby improving long-term stability of the quartz TSM resonator 100 (particularly where an underlying tab is also used to facilitate a strong bond between the electrode flag 118 and the center resonator structure 106, see FIG. 4). The overlaying tab 120 or underlying tab 122 may comprise any suitable metal for facilitating the functionality discussed above, such as chromium, titanium, nickel, tungsten, molybdenum, niobium, and/or others.

Figure 4:
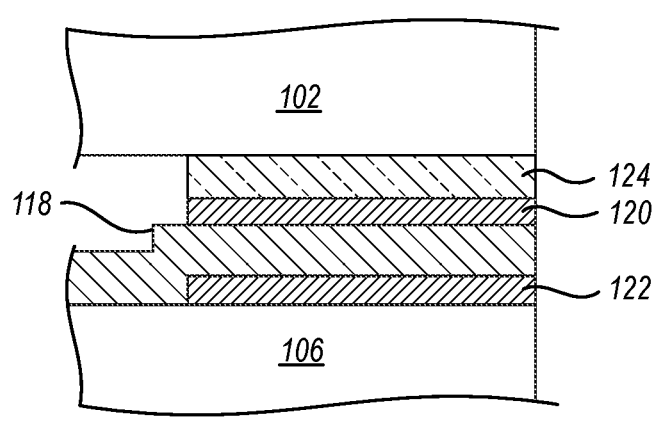
FIG. 4 illustrates a schematic representation of various components of a quartz TSM resonator for facilitating bonding of a cap to a center resonator structure.

FIG. 4 illustrates a schematic representation of various components of a quartz TSM resonator 100 for facilitating bonding of a cap 102 to a center resonator structure 106. FIG. 4 illustrates a portion of the electrode flag 118 discussed above with reference to FIG. 3 (e.g., an outer portion of the electrode flag 118), as well as the overlaying tab 120 positioned thereover.

FIG. 4 also shows an underlying tab 122 positioned between the electrode flag 118 and the center resonator structure 106. The underlying tab 122 is positioned on an opposite side of the electrode flag 118 relative to the overlaying tab 120. As noted hereinabove, the underlying tab 122 may comprise a tab metal that bonds well to quartz crystal resonators (e.g., the center resonator structure 106) and that migrates into the electrode flag 118 under high heat (forming an intermetallic bond therebetween). Implementing an underlying tab 122 may contribute to improving the long-term stability of the quartz TSM resonator 100 by facilitating a strong bond between the electrode flag 118 and the center resonator structure. An underlying tab 120 may comprise any suitable metal for facilitating the functionality discussed above, such as chromium, titanium, nickel, tungsten, molybdenum, niobium, and/or others.

Where both an underlying tab 122 and an overlaying tab 120 are implemented on opposing sides of an electrode flag 118, as depicted in FIG. 4, both the underlying tab 122 and the overlaying tab 120 may contribute to tab metals becoming migrated into the electrode flag 118 from opposing sides of the electrode flag. Utilizing an electrode flag that has tab metals migrated thereinto from opposing sides thereof may advantageously reduce tearing or slipping of the electrode flag 118 during cooling and/or may improve the bonding between the electrode flag and the cap 102 and the center resonator structure 106.

In some implementations, the overlaying tab 120 and the underlying tab 122 comprise the same tab metal(s), whereas, in other implementations, the overlaying tab 120 and the underlying tab 122 comprise at least partially different tab metal(s).

FIG. 4 also shows a sealing glass 124 between the cap 102 and the overlaying tab 120 for bonding the cap 102 to the overlaying tab 120. One will appreciate, in view of the present disclosure, that sealing glass 124 may also be used to fill portions between the cap 102 and the center resonator structure 106 that do not include the electrode flag 118 and/or tabs 120, 122. In this regard, a sealing glass 124 may be used to bond the cap 102 to the center resonator structure 106 and the overlaying tab 120 (e.g., where the overlaying tab 120 is bonded to the electrode flag 118, the electrode flag 118 is bonded to the underlying tab 122, and the underlying tab 122 is bonded to the center resonator structure 106).

One will appreciate, in view of the present disclosure, that the particular or relative shapes, arrangements, and/or configurations of the various components discussed hereinabove and/or hereinafter in association with the quarts TSM resonator 100 are provided by way of example only and are not limiting of the present disclosure. For instance, the electrically conductive paths between a center resonator structure and an external oscillator circuit may take on any suitable form alternative to the example electrically conductive paths shown herein (e.g., utilizing one or more notched recesses in one or more caps to accommodate wire connections).

For example, although FIG. 3 depicts the electrode 116 with a generally circular shape, an electrode may comprise any suitable shape (e.g., an oval, square, or other shape). Furthermore, although FIG. 3 depicts the electrode flag 118 as a linear rectangular electrically conductive path, an electrode flag may comprise any suitable path shape (e.g., keyway, zigzag, curved, angled, etc.).

Still furthermore, although FIG. 4 depicts the overlaying tab 120 and the underlying tab 122 as solid elements that cover directly opposing portions of the opposing sides of the electrode flag 118, other configurations are within the scope of the present disclosure. For example, the underlying tab may be formed in a striped pattern (or dot pattern, cross hatch, and/or any other pattern), and the underlying tab may include a stripe that covers a particular portion of the electrode flag where a directly opposing portion of the electrode flag on the opposing side of the electrode flag is not covered by the overlaying tab (or vice versa).

In addition, one will appreciate, in view of the present disclosure, that although FIGS. 3 and 4 illustrate the underlying tab 122 and the overlaying tab 120 as covering a particular proportion of its corresponding side of the electrode flag 118, an underlying tab or an overlaying tab may cover any desired proportion of its corresponding side of the electrode flag 118 (e.g., an underlying tab may cover a percentage of its corresponding side of an electrode flag within a range of about 10% to about 100%, and/or an overlaying tab may cover a percentage of its corresponding side of an electrode flag within a range of about 10% to about 100%; in some instances, a tab may extend beyond one or more portions of an electrode flag). Furthermore, those of skill in the art will recognize, in view of the present disclosure, that the underlying tab 122 and the overlaying tab 120 need not cover the same proportion of their corresponding sides of the electrode flag 118.

The foregoing example configurations, structures, and/or details of components associated with the first electrically conductive path 112 and/or cap 102 of the quartz TSM resonator may be applied, without loss of generality, to the components associated with the second electrically conductive path 112' and/or cap 104 of the quartz TSM resonator. For example, referring again to FIG. 2, the second electrically conductive path 112' may be formed from a second electrode (corresponding to the first electrode 116, see FIG. 3) positioned on the second side 114' of the center resonator structure 106 (see FIG. 2). Furthermore, the second electrically conductive path 112' may include a second electrode flag (corresponding to the first electrode flag 118, see FIG. 3) that extends over the second side 114' of the center resonator structure 106 toward an outer portion of the center resonator structure 106 (e.g., to contact the external electrode 108').

In some instances, as indicated in FIG. 2, the first electrode flag 118 and the second electrode flag extend away from the center of the center resonator structure 106 in opposing or otherwise different directions, whereas, in some instances, the first electrode flag 118 and the second electrode flag extend away from the center of the center resonator structure 106 in the same direction.

Furthermore, the quartz TSM resonator 100 may include a second underlying tab (corresponding to the first underlying tab 122) positioned between the second electrode flag and the center resonator structure 106. The second underlying tab may be bonded to the second electrode flag and the center resonator structure 106, and the second underlying tab may contribute to tab metals being migrated into the second electrode flag. Furthermore, the quartz TSM resonator 100 may include a second overlaying tab (corresponding to the first overlaying tab 120) positioned over the second electrode flag. The second overlaying tab may be arranged on an opposing side of the second electrode flag relative to the second underlying tab. The second overlaying tab may be bonded to the second electrode flag, and the second overlaying tab may contribute, in addition to the underlying tab, to tab metals being migrated into the second electrode flag. In this regard, the second electrode flag may have tab metals migrated thereinto from opposing sides thereof.

The cap 104 may be bonded to the center resonator structure 106 and the second overlaying tab via a sealing glass (similar to the bond between the cap 102 and the center resonator structure and the first overlaying tab 120). By implementing underlying and overlaying tabs about the electrode flags of quartz TSM resonators, as discussed hereinabove, the long-term stability and/or efficiency of quartz TSM resonators may be improved.

Figure 5:
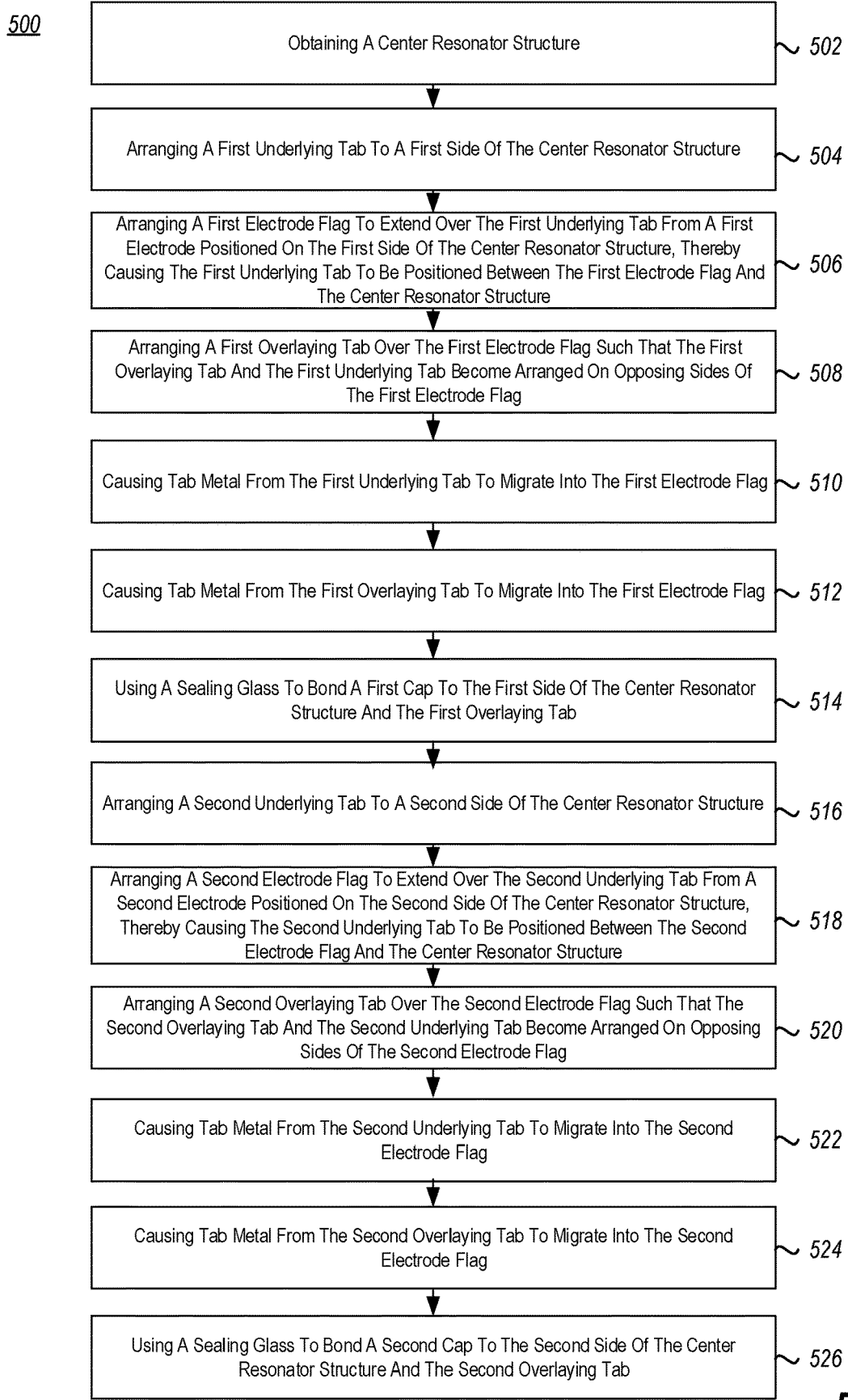
FIG. 5 illustrates an example flow diagram depicting acts associated with creating a quartz pressure sensor.

Some implementations of the present disclosure can also be described in terms of acts (e.g., acts of a method) for accomplishing one or more particular results. Along these lines, FIG. 5 illustrates an example flow diagram 500 depicting acts associated with creating a quartz pressure sensor. Although the acts shown in flow diagram 500 may be illustrated and/or discussed in a certain order, no particular ordering is required unless specifically stated or required because an act is dependent on another act being completed prior to the act being performed. For example, in some instances, two or more of the acts shown in flow diagram 500 are performed simultaneously. Furthermore, it should be noted that, in some implementations, not all acts represented in flow diagram 500 are essential for creating a quartz pressure sensor.

In some instances, the acts of flow diagram 500 are described below with reference to the components, structures, and/or elements of FIGS. 1-4. For instance, at least some reference numerals included parenthetically hereinbelow refer, by way of illustrative example, to systems, components, structures, and/or elements described hereinabove with reference to FIGS. 1-4.

Act 502 of flow diagram 500 includes obtaining a center resonator structure (106). The center resonator structure may comprise a quartz crystal resonator as described hereinabove.

Act 504 of flow diagram 500 includes arranging a first underlying tab (122) to a first side (114) of the center resonator structure (106). In some instances, the first underlying tab comprises any suitable tab metal that bonds well to quartz and that migrates into adjacent gold or platinum when heated. For example, the first underlying tab may comprise chromium, titanium, nickel, tungsten, molybdenum, niobium, and/or others.

Act 506 of flow diagram 500 includes arranging a first electrode flag (118) to extend over the first underlying tab (122) from a first electrode (116) positioned on the first side (114) of the center resonator structure (116), thereby causing the first underlying tab (122) to be positioned between the first electrode flag (118) and the center resonator structure (106). The first electrode may comprise gold, platinum, or any electrically conductive material suitable for use in a TSM resonator. Under such positioning, tab metal from the first underlying tab may migrate into the first electrode flag when heated. In some implementations, the first underlying tab includes a thin layer of material that matches the material of the first electrode flag (e.g., gold or platinum). Implementing such a thin layer of material on the first underlying tab may reduce oxidation of the adhesion layer between the first electrode flag and the first underlying tab during heating. Furthermore, in some implementations, the first electrode and/or first electrode flag includes a thin layer of adhesion material (e.g., Cr, Ti, and/or others) to improve the adhesion of the first electrode and/or first electrode flag to the center quartz resonator structure.

Act 508 of flow diagram 500 includes arranging a first overlaying tab (120) over the first electrode flag (118) such that the first overlaying tab (120) and the first underlying tab (122) become arranged on opposing sides of the first electrode flag (118) (e.g., above and below the first electrode flag). The first overlaying tab may comprise any suitable tab metal that bonds well to sealing glass and that migrates into adjacent gold or platinum when heated. For example, the first underlying tab may comprise chromium, titanium, nickel, tungsten, molybdenum, niobium, and/or others.

Act 510 of flow diagram 500 includes causing tab metal from the first underlying tab (122) to migrate into the first electrode flag (118). Act 508 may be performed, in some instances, by heating at least the first electrode flag and the first underlying tab to a temperature that facilitates or accelerates metal migration from the first underlying tab to the first electrode flag (e.g., greater than 175° C.).

Act 512 of flow diagram 500 includes causing tab metal from the first overlaying tab (120) to migrate into the first electrode flag (118). Act 512 may be performed, in some instances, by heating at least the first overlaying tab and the first electrode flag to a temperature that facilitates or accelerates metal migration from the first overlaying tab to the first electrode flag (e.g., greater than 175°). Similar to the first underlying tab, in some implementations, the first overlaying tab may include a thin layer of material that matches the material of the first electrode flag (e.g., gold or platinum). Implementing such a thin layer of material on the first overlaying tab may reduce oxidation of the adhesion layer between the first electrode flag and the first overlaying tab during heating.

Act 514 of flow diagram 500 includes using a sealing glass (124) to bond a first cap (102) to the first side (114) of the center resonator structure (106) and the first overlaying tab (120). The first cap and the center resonator structure may form a first cavity between the first cap and the first side of the center resonator structure.

As noted above, in some instances, various acts may be performed in a substantially simultaneous manner. For example, acts 510, 512, and/or 514 may be performed during the same heating process or during any combination of heating processes.

Act 516 of flow diagram 500 includes arranging a second underlying tab to a second side (114') of the center resonator structure (106). The second underlying tab may generally correspond to the first underlying tab discussed above with reference to act 504 (however, the second underlying tab may differ from the first underlying tab in at least some respects, such as material, orientation, pattern, etc.).

Act 518 of flow diagram 500 includes arranging a second electrode flag to extend over the second underlying tab from a second electrode positioned on the second side (114') of the center resonator structure (106), thereby causing the second underlying tab to be positioned between the second electrode flag and the center resonator structure (106). The second electrode flag may generally correspond to the first electrode flag discussed above with reference to act 506 (however, the second electrode flag may differ from the first electrode flag in at least some respects, such as material, orientation, path, etc.)

Act 520 of flow diagram 500 includes arranging a second overlaying tab over the second electrode flag such that the second overlaying tab and the second underlying tab become arranged on opposing sides of the second electrode flag. The second overlaying tab may generally correspond to the first overlaying tab discussed above with reference to act 510 (however, the second overlaying tab may differ from the first overlaying tab in at least some respects, such as material, orientation, pattern, etc.)

Act 522 of flow diagram 500 includes causing tab metal from the second underlying tab to migrate into the second electrode flag. Similar to act 508, act 520 may be performed, in some instances, by heating at least the second underlying tab and the second electrode flag to a temperature that facilitates or accelerates metal migration from the second underlying tab to the second electrode flag.

Act 524 of flow diagram 500 includes causing tab metal from the second overlaying tab to migrate into the second electrode flag. Similar to act 512, act 524 may be performed, in some instances, by heating at least the second overlaying tab and the second electrode flag to a temperature that facilitates or accelerates metal migration from the second overlaying tab to the second electrode flag.

Act 526 of flow diagram 500 includes using a sealing glass to bond a second cap (104) to the second side (114') of the center resonator structure (106) and the second overlaying tab. The second cap and the center resonator structure may form a second cavity between the second cap and the second side of the center resonator structure.

Again, as noted above, various acts may be performed in a substantially simultaneous manner. For instance, acts 510, 512, 514, 522, 524, and/or 526 may be performed during the same heating process or during any combination of heating processes.

During operation, the center resonator structure may resonate between the first and second cavities to facilitate pressure measurements of a surrounding environment. FIG. 2 illustrates the first cavity 126 formed between the first cap 102 and the center resonator structure 106, as well as the second cavity 128 formed between the second cap 104 and the center resonator structure 106.

In at least some conventional TSM resonators, the cavities (e.g., cavities 126 and 128) that surround the center resonator structure (e.g., center resonator structure 106) are filled with an inert gas (e.g., helium, argon, nitrogen, and/or other inert gases) during the bonding process for forming a TSM resonator. The inert gas can facilitate heat transfer during the bonding process without reacting with the bonding glass or the metals in an undesirable manner.

Although the use of an inert gas during bonding as discussed above may provide some benefits, the use of an inert gas during bonding results in a partial pressure that remains within the cavities of the TSM resonator (e.g., greater than 500 torr, such as near 760 torr). Although this partial pressure reduces slightly as the TSM resonator structure cools after bonding, higher partial pressure is associated with higher motional resistance and lower quality factor for resonating devices.

Accordingly, at least some implementations of the present disclosure include performing the bonding process to form a TSM resonator under vacuum conditions (e.g., below 500 torr). Those skilled in the art have hitherto been discouraged from attempting to form TSM resonators under vacuum conditions because of the long time associated with heating TSM resonator components to facilitate bonding, and the tendency of sealing glass material to outgas (creating voids in the bond) when heated under vacuum conditions. However, it has been shown, in accordance with the present disclosure, that volatilities in the sealing glass can be reliably baked out with a sufficiently prolonged heating time, thereby accomplishing sealing under vacuum conditions.

Performing the bonding process to form a TSM resonator under vacuum conditions, as discussed herein, may facilitate a 20-30% reduction in motional resistance relative to TSM resonators formed under conventional bonding techniques (e.g., utilizing inert gases).

Various vacuum pressures are within the scope of the present disclosure. In some instances, the lower the vacuum pressure, the lower the motional resistance and the greater the quality factor associated with the resulting TSM resonator (however, lower vacuum pressure may result in longer time periods for facilitating bonding and baking out volatilities). In some implementations, the vacuum pressure used during the bonding process for forming a TSM resonator (e.g., pressure within the cavities during bonding, or pressure of the chamber that the TSM resonator resides in during the bonding process) is within a range of about 100 torr to about 500 torr, within a range of about 0.1 torr and about 100 torr, within a range of about 0.01 torr and about 0.1 torr, within a range of about 0.001 and about 0.01 torr, or below about 0.001 torr.

It will be appreciated, in view of the present disclosure, that an inert gas may be used during heating to facilitate heat transfer as discussed above, but then be removed to facilitate vacuum conditions near a target bonding temperature.

Accordingly, a quartz TSM resonator formed in accordance with the foregoing vacuum conditions may comprise a center resonator structure (106) and a first cap (102) bonded to a first side (114) of the center resonator structure (106), and/or a second cap (104) bonded to a second side (114') of the center resonator structure (106). A first cavity (126) is formed between the first cap (102) and the first side (114) of the center resonator structure (106), and a second cavity (128) is formed between the second cap (104) and the second side (114') of the center resonator structure (106).

In some implementations, the final pressure within one or more of the cavities (e.g., cavities 126 and/or 128) of the quartz TSM resonator is within a range of about 100 torr to about 500 torr, within a range of about 0.1 torr and about 100 torr, within a range of about 0.01 torr and about 0.1 torr, within a range of about 0.001 and about 0.01 torr, or below about 0.001 torr. For example, the final pressure within cavity 126 and/or cavity 128 may be below about 130 torr, or within a range of about 0.01 torr to about 0.02 torr.

It will be appreciated, in view of the present disclosure, that different cavities may comprise different final pressures. Furthermore, those skilled in the art will recognize, in view of the present disclosure, that the techniques described herein associated with utilizing vacuum conditions during the bonding process for forming a TSM resonator may be performed in combination with or in the absence of the techniques described herein associated with implementing "tab sandwiches" about electrode flags.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A pressure sensor that resonates in a thickness-shear mode (TSM), comprising:
a center resonator structure;
a first electrode positioned on a first side of the center resonator structure; and
a first electrode flag forming a first electrically conductive path from the first electrode toward an outer portion of the center resonator structure, the first electrode flag extending at least partially over the first side of the center resonator structure, the first electrode flag comprising one or more first tab metals migrated thereinto from opposing sides of the first electrode flag.

2. The pressure sensor of claim 1, wherein the center resonator structure comprises a quartz crystal resonator.

3. The pressure sensor of claim 2, wherein the quartz crystal resonator comprises an AT-cut crystal, a near AT-cut crystal, a BT-cut crystal, a near BT-cut crystal, an SC-cut crystal, or a near SC-cut crystal.

4. The pressure sensor of claim 2, wherein the quartz crystal resonator comprises a single mode or a dual mode crystal.

5. The pressure sensor of claim 1, wherein the first electrode flag comprises gold or platinum.

6. The pressure sensor of claim 1, wherein the one or more first tab metals comprise one or more of chromium, titanium, nickel, tungsten, molybdenum, or niobium.

7. The pressure sensor of claim 1, further comprising a first underlying tab positioned between the first electrode flag and the center resonator structure, the first underlying tab being bonded to the first electrode flag and the center resonator structure, wherein the first underlying tab contributes to the one or more first tab metals migrated into the first electrode flag.

8. The pressure sensor of claim 7, further comprising a first overlaying tab positioned over the first electrode flag, the first overlaying tab being arranged on an opposing side of the first electrode flag relative to the first underlying tab, the first overlaying tab being bonded to the first electrode flag, wherein the first overlaying tab contributes to the one or more first tab metals migrated into the first electrode flag.

9. The pressure sensor of claim 8, wherein at least one of the first underlying tab or the first overlaying tab covers at least 10% of a corresponding side of the first electrode flag.

10. The pressure sensor of claim 8, wherein the first underlying tab and the first overlaying tab comprise a same tab metal.

11. The pressure sensor of claim 8, further comprising a first cap bonded to the center resonator structure to form a first cavity between the first cap and the first side of the center resonator structure, wherein a sealing glass bonds the first cap to the first side of the center resonator structure and the first overlaying tab.

12. The pressure sensor of claim 11, further comprising:
a second electrode positioned on a second side of the center resonator structure;
a second electrode flag forming a second electrically conductive path from the second electrode toward an outer portion of the center resonator structure, the second electrode flag extending at least partially over the second side of the center resonator structure, the second electrode flag comprising one or more second tab metals migrated thereinto from opposing sides of the second electrode flag;
a second underlying tab positioned between the second electrode flag and the center resonator structure, the second underlying tab being bonded to the second electrode flag and the center resonator structure, wherein the second underlying tab contributes to the one or more second tab metals migrated into the second electrode flag;
a second overlaying tab positioned over the second electrode flag, the second overlaying tab being arranged on an opposing side of the second electrode flag relative to the second underlying tab, the second overlaying tab being bonded to the second electrode flag, wherein the second overlaying tab contributes to the one or more second tab metals migrated into the second electrode flag; and
a second cap bonded to the center resonator structure to form a second cavity between the second cap and the second side of the center resonator structure, wherein a sealing glass bonds the second cap to the second side of the center resonator structure and the second overlaying tab.

13. The pressure sensor of claim 12, wherein the one or more first tab metals and the one or more second tab metals comprise one or more of a same tab metal.

14. A method for creating a quartz pressure sensor that resonates in a thickness-shear mode (TSM), the method comprising:
obtaining a center resonator structure;
arranging a first underlying tab to a first side of the center resonator structure;
arranging a first electrode flag to extend over the first underlying tab from a first electrode positioned on the first side of the center resonator structure, thereby causing the first underlying tab to be positioned between the first electrode flag and the center resonator structure;
arranging a first overlaying tab over the first electrode flag such that the first overlaying tab and the first underlying tab become arranged on opposing sides of the first electrode flag;
causing tab metal from the first underlying tab to migrate into the first electrode flag; and
causing tab metal from the first overlaying tab to migrate into the first electrode flag.

15. The method of claim 14, wherein the first underlying tab or the first overlaying tab comprises a layer of material that matches a material of the first electrode flag.

16. The method of claim 14, further comprising:
using a sealing glass to bond a first cap to the first side of the center resonator structure and the first overlaying tab, wherein the first cap and the center resonator structure form a first cavity between the first cap and the first side of the center resonator structure.

17. The method of claim 16, wherein the method further comprises:
arranging a second underlying tab to a second side of the center resonator structure;
arranging a second electrode flag to extend over the second underlying tab from a second electrode positioned on the second side of the center resonator structure, thereby causing the second underlying tab to be positioned between the second electrode flag and the center resonator structure;
arranging a second overlaying tab over the second electrode flag such that the second overlaying tab and the second underlying tab become arranged on opposing sides of the second electrode flag;
causing tab metal from the second underlying tab to migrate into the second electrode flag;

causing tab metal from the second overlaying tab to migrate into the second electrode flag; and using a sealing glass to bond a second cap to the second side of the center resonator structure and the second overlaying tab, wherein the second cap and the center resonator structure form a second cavity between the second cap and the second side of the center resonator structure.

\* \* \* \* \*